United States Patent Office

2,803,306
Patented Aug. 20, 1957

2,803,306

PROCESS FOR INCREASING PERMEABILITY OF UNDERGROUND FORMATION

Wayne F. Hower, Duncan, Okla., assignor to Halliburton Oil Well Cementing Company, Duncan, Okla.

No Drawing. Application April 13, 1955,
Serial No. 501,200

4 Claims. (Cl. 166—29)

This invention relates generally to the treating of wells and, more particularly, to well treating operations in which a treating fluid is applied to an underground structure or formation which includes several zones having varying permeabilities and it is desired for the fluid to enter both the less permeable and the more permeable zones thereof.

It is believed that the invention will be most widely used in connection with treating operations of the type which are performed in a well to restore or increase the permeability of an underground formation through which it is desired to conduct fluids in the course of producing or operating the well. For example, such an operation may be performed in a recently drilled well to remove from an underground oil-bearing formation as much as possible of the mud filter cake or mud sheath built up thereon as a result of the circulation of drilling mud during the drilling of the well.

In removing from the walls of a formation a mud sheath or other structure containing bentonite or limestone substances, it is common practice to treat the formation with a treating fluid containing an acid, such as hydrochloric acid, which by chemical action removes or reduces in size limestone or bentonite particles which are plugging or blocking the existing pore spaces or channels of the formation. The acid may also act upon limestone or bentonite substances contained in the formation itself and thus may enlarge the existing pore spaces or channels or create additional passageways through which fluids may be conducted.

Prior hereto various additives and agents have been proposed for use in treating fluids of the type described to improve or facilitate the performance of the treating operation. For example, it has heretofore been common practice to include in the treating fluid a surface active or "wetting" agent, which it is generally believed greatly improves the effectiveness of the acid, such as by lowering the interfacial tension between the fluid and the formation or structure which the fluid enters, with the result that the fluid penetrates farther into the zones it reaches.

While such prior art proposals have generally provided advantages in particular operations, certain difficulties have at times been encountered. For example, in treating with acid an underground formation or structure which includes several zones having varying permeabilities, it oftentimes happens that the treating fluid enters to a greater extent the more permeable zones where the acid becomes spent without adequately treating the less permeable zones. While the inclusion of a surface active or "wetting" agent in the treating fluid generally enables the fluid to more adequately penetrate the zones it reaches, it does not in itself prevent the treating fluid from by-passing the less permeable zones. Accordingly, it is not uncommon, particularly in treating with acid an oil-bearing formation having a thick vertical dimension and including several zones having varying permeabilities, to find that the treating fluid has by-passed and failed to appreciably restore or increase the permeability of the less permeable zones of the formation, which zones may nevertheless contain oil in paying quantities.

It is an object of this invention to overcome the foregoing and other difficulties by providing an improved composition for and method of treating with acid an underground formation or structure which includes several zones having varying permeabilities. Other objects and advantages of the invention will become more apparent as the description of the invention proceeds.

In accordance with the invention, an underground well formation or structure which includes several zones having varying permeabilities is treated with a treating fluid which is prepared by dispersing in an acid solution a quantity of solid or discrete particles at least a substantial portion of which are insoluble in the acid solution but are soluble in hydrocarbon liquids, such as oil. As the treating fluid is applied to the formation or structure, the dispersed particles are temporarily deposited in or opposite the pore spaces or channels of the more permeable zones and thereby reduce the tendency of the treating fluid to enter those zones and by-pass the less permeable zones. Since the particles are soluble in hydrocarbon liquids, such as oil, the temporary deposits formed thereby may subsequently be removed, such as by flushing or otherwise circulating oil in the well.

In one way of proceeding, the treating fluid is prepared by dispersing the solid or discrete particles in an aqueous solution of hydrochloric acid, to which has been added a surface active or "wetting" agent which is capable of lowering the interfacial tension between the particles and the acid solution. The particles are preferably dispersed throughout the acid solution, such as by vigorously stirring or agitating the solution while the particles are added thereto.

If desired, various other additives and agents may be included in the treating fluid. The surface active agent is preferably selected so as not only to improve the efficiency of the particle dispersion, but also to improve the efficiency of the treating fluid in the well, such as by preventing or breaking emulsions which are likely to be formed and by lowering the interfacial tension between the treating fluid and the formation or structure to which it is applied.

Among the other additives or agents which may, if desired, be included in the treating fluid, it is herein proposed to add thereto a quantity of a hydrocarbon liquid, such as diesel oil or kerosene, in an amount sufficient to partially dissolve the solid particles so as to soften them somewhat, but leaving them as discrete particles. As a result of becoming softened, the dispersed particles have less tendency to settle and thus remain more thoroughly dispersed in the treating fluid. Also, the softened particles appear to have improved plugging characteristics.

The order of mixing the ingredients is not critical. For example, satisfactory results are obtainable if the surface active agent is added to the acid solution after the particles have been mixed therewith. However, the particles will generally disperse more readily if the surface active agent is added first. If desired, all the ingredients may be mixed together at the same time.

The treating fluid may be prepared at or near the well site or, if desired, may be partially or completely prepared at a remote location and brought to the well in suitable containers. In the event that there is a considerable lapse of time between the mixing of the ingredients and their introduction into the well, it is recommended that the treating fluid be again stirred or otherwise agitated in order to assure that the particles are adequately dispersed therein.

After the treating fluid has been prepared, as aforesaid, it is then introduced into a well the bore of which traverses an underground formation or structure which is to be treated. Where it is desired to remove a mud filter cake or mud sheath built up along the walls of an oil-bearing well formation, the prepared treating fluid may be introduced into the well by pumping it through tubing extending downwardly to the oil-bearing formation. Preferably a well packer is expanded into engagement with the wall of the bore hole at or near the upper limit of the formation so as to provide a fluid-tight seal isolating the treating fluid from the higher portions of the well. It may also be necessary or desirable to employ another well packed at or near the lower limit of the formation.

The treating fluid is displaced from the tubing, such as by applying pump pressure, and is brought into contact with the surrounding formation and/or mud sheath, where it is permitted to remain for a period of time, usually from one to several hours. During this time the acid in the treating fluid attacks and dissolves substances, such as limestone contained in the mud sheath and perhaps in the formation itself. Also, the acid acts upon bentonite accessible to it, causing the bentonite particles to shrink or be reduced in size.

Since the more permeable zones of the mud sheath and/or formation commonly offer less resistance to the entry of the treating fluid than do the less permeable zones, a relatively high percentage of the treating fluid may initially enter the more permeable zones. In certain wells the mud sheath may be more or less uniformly permeable throughout its length and the treating fluid may initially enter all zones at about the same rate. However, as the treatment continues and portions of the mud sheath are removed, there is a likelihood that more permeable zones will be exposed, whereupon a larger percentage of the treating fluid may enter these zones.

Since the solid or discrete particles are dispersed generally throughout the treating fluid, the existence or development of a condition wherein there is excessive entry of the treating fluid into the more permeable zones of the mud sheath and/or formation will result in a large percentage of the dispersed particles becoming deposited in or opposite the more permeable zones.

It is convenient to consider the deposits of solid or discrete particles as being, in effect, a secondary and temporary filter cake which builds up more readily in the more permeable zones and, as a result, tends to automatically equalize the effective permeability of the several zones of the mud sheath and/or formation as the treating operation is performed.

Since the deposited particles are soluble in hydrocarbon liquids, such as oil, the secondary filter cake may be removed upon completion of the treating operation. In certain wells, particularly where the formation pressure is high enough for the well to produce oil without pumping, it may be satisfactory to remove the secondary filter cake by producing the well. Where oil is pumped into the well behind the treating fluid to displace it from the tubing, it may be satisfactory upon completion of the treating operation to circulate this oil in the well in order to remove the secondary filter cake.

The particles dispersed in the treating fluid may be made from any of various suitable substances or materials. At least a substantial portion of the particles should be soluble in hydrocarbon liquids, such as oil, and should be capable of being carried by the treating fluid into the well as discrete particles which partially plug the more permeable zones of the formation or structure which is to be treated. Gilsonite is a readily available and relatively inexpensive oil-soluble material which may be ground or pulverized to provide particles satisfactory for use in most operations. Naphthalene is another oil-soluble material which may be obtained in or reduced to particle sizes suitable for use in accordance with the invention. Other examples of oil-soluble materials which in granulated form may be satisfactorily used in certain operations are paradichlorobenzene, anthracene, and beta naphthol.

In certain operations where the treating fluid will be likely to be subjected to high temperatures, such as are commonly encountered in deep wells, difficulties may be encountered if dispersed particles having low melting points are used. In this connection it should be noted that gilsonite softens somewhat at temperatures between about 250–300° F., while naphthalene has a melting point of about 176° F. It is believe that one or the other of these materials will be satisfactory for use in most operations. By way of comparison, paradichlorobenzene has a melting point of about 127° F., which limits its usefulness to operations where high temperatures are not encountered. On the other hand, anthracene has a considerably higher melting point of about 422° F. and beta naphthol has a melting point of about 251° F. It should also be mentioned that the cost of certain otherwise satisfactory materials may be prohibitively high insofar as most operations are concerned.

As with treatments using prior art compositions and methods, the quantity of treating fluid used will vary from well to well. Ordinarily it will be desirable to prepare at one time a sufficiently large quantity to treat the particular well involved, but it may be desirable or necessary to apply the fluid in batches rather than all at once. In certain wells a one hundred gallon treatment, or perhaps even less, may be enough, while in certain other wells, such as in deep wells traversing formations several hundred feet thick, several thousand gallons of treating fluid may be required.

The ratio of particles to liquids used in a particular operation should be sufficiently high so that the more permeable zones become partially, but preferably not completely, plugged with temporary deposits. There are several factors which determine the extent of the plugging which occurs, and these factors and their effect vary from well to well. It is believed that in most operations the quantity of solid or discrete particles required will not exceed about 5 to 7 pounds for each gallon of treating fluid prepared, but experience may show that a larger or smaller ratio of particles to liquids will be required for best results in particular operations.

The size of the particles required for satisfactory results can best be determined with reference to information previously obtained concerning the permeability of the formation or structure which is to be treated. Generally speaking, best results will be obtained if the dispersed particles are of varying sizes. It is believed that in most operations the desired range of particle sizes will fall within the general range which includes those particles which are passed by a 10 mesh screen and are rejected by a 325 mesh screen, although satisfactory results may be obtained even though the particles used do not all fall within this range.

If during a particular treating operation there occurs excessive plugging of the pore spaces or channels of the formation or structure being treated and it becomes difficult to inject additional fluid thereinto, it may become necessary to discontinue the application of treating fluid and take steps to dissolve or otherwise remove a portion of the temporary deposits, such as by flushing the well with oil, whereupon the treating operation may be resumed using a treating fluid containing a smaller proportion of dispersed particles. In some instances it may be necessary or desirable to employ in subsequent applications particles having larger sizes or to include less softening oil in the treating fluid.

It is believed that the quantity of softening oil required for best results will seldom exceed about 10–15% by volume, based on the volume of the acid solution.

It should be mentioned that in some instances the behavior of the treating fluid in the well will be indicated by the pump pressure required to maintain a given injection rate. For example, if the pump pressure initially required is relatively high, this may indicate that the mud sheath is more or less uniformly permeable and that the treating fluid is entering all zones at about the same rate. If thereafter the pump pressure required to maintain the same injection rate decreases, this may indicate that the acid has removed portions of the mud sheath and has exposed more permeable zones into which a large percentage of the treating fluid is entering. If subsequently the pump pressure rises appreciably, this may indicate that the dispersed particles in the treating fluid have successfully built up a secondary filter cake which is partially obstructing or blocking the entry of the treating fluid into the previously exposed more permeable zones, with the result that all zones are receiving treatment.

Thus, the invention provides an improved treating fluid and method of applying it in treating with acid an underground well formation or structure which includes several zones having varying permeabilities. In particular, the invention provides advantages in that the treating fluid is caused to enter both the less permeable and the more permeable zones of the formation or structure.

While only one embodiment of the invention has been disclosed herein, various changes and improvements included within the spirit of the invention will now suggest themselves to those skilled in the art. Accordingly, the invention is best defined by the scope of the appended claims.

I claim:

1. In a process for restoring or increasing the permeability of an underground formation or other structure traversed by a well bore and including several zones having varying permeabilities, the steps of introducing into said well bore and thence into contact with said structure a treating fluid containing hydrochloric acid and having dispersed therein a quantity of discrete particles of an oil-soluble material selected from the class consisting of gilsonite, naphthalene, para-dichlorobenzene, anthracene, and beta naphthol, whereupon as the treatment continues said particles provide temporary deposits partially plugging the more permeable zones of said structure and thereby substantially reduce the tendency of said treating fluid to by-pass the less permeable zones thereof, and thereafter removing said temporary deposits by circulating oil into contact therewith.

2. The invention as claimed in claim 1 wherein the discrete particles dispersed in said treating fluid are softened with a hydrocarbon liquid.

3. A treating fluid useful in the treating of wells to restore or increase the permeability of an underground formation or other structure traversed by the bore of a well consisting essentially of an aqueous hydrochloric acid solution capable of attacking substances in said well bore and structure to open pore spaces or channels through which fluids may be conducted, a quantity of discrete particles which are insoluble in said acid solution but are soluble in hydrocarbon liquids, said particles being selected from the class consisting of particles of gilsonite, naphthalene, para-dichlorobenzene, anthracene, and beta naphthol, and a surface active agent capable of lowering the interfacial tension between said acid solution and said particles.

4. A treating fluid useful in the treating of an underground formation or other structure traversed by a well bore consisting essentially of an aqueous hydrochloric acid solution, a quantity of discrete particles selected from the class consisting of particles of gilsonite, naphthalene, para-dichlorobenzene, anthracene, and beta naphthol, said particles being insoluble in said acid solution but soluble in hydrocarbon liquids and being included in sizes and amounts sufficient to at least partially obstruct the more permeable zones of said structure, a quantity of hydrocarbon liquid in an amount sufficient to soften said particles, and a surface active agent capable of lowering the interfacial tension between said acid solution and said particles.

References Cited in the file of this patent

UNITED STATES PATENTS

| | | |
|---|---|---|
| 2,032,826 | Ambrose et al. | Mar. 3, 1936 |
| 2,634,098 | Armentrout | Apr. 7, 1953 |
| 2,689,009 | Brainerd | Sept. 14, 1954 |